(12) United States Patent
Kenninga (10) Patent No.: US 6,510,441 B1
(45) Date of Patent: Jan. 21, 2003

(54) OPTIMAL LINE BREAK DETERMINATION

(75) Inventor: Eric A. Kenninga, Seattle, WA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/209,791

(22) Filed: Dec. 11, 1998

(51) Int. Cl.[7] .............................................. G06F 17/21
(52) U.S. Cl. ...................... 707/521; 707/517; 707/531
(58) Field of Search ................................ 707/521, 500, 707/517, 531

(56) References Cited

U.S. PATENT DOCUMENTS

| | | | | |
|---|---|---|---|---|
| 5,438,512 A | * | 8/1995 | Mantha et al. | 707/517 |
| 5,625,773 A | * | 4/1997 | Bespalko et al. | 345/467 |
| 5,835,920 A | * | 11/1998 | Horton | 707/517 |
| 5,978,819 A | * | 11/1999 | Berstis | 707/513 |
| 6,018,749 A | * | 1/2000 | Rivette et al. | 707/525 |
| 6,044,383 A | * | 3/2000 | Suzuki et al. | 707/509 |
| 6,189,020 B1 | * | 2/2001 | Shimizu | 707/526 |
| 6,279,018 B1 | * | 8/2001 | Kudrolli et al. | 707/540 |

OTHER PUBLICATIONS

Rod Stephens, "Ready–to–Run, Visual Basic Algorithms," Second Edition, *Wiley Computer Publishing*, pp. 117–185.

URW hz–program, "Micro–typography for advanced typesetting," *URW Software & TypeGmbH*, Hamburg, Germany, 1993, 1–38.

Knuth et al., "Breaking Paragraphs into Lines," *Software–Practice and Experience*, vol. 11,, pp. 1119–1184, Feb. 1981.

* cited by examiner

Primary Examiner—Stephen S. Hong
(74) Attorney, Agent, or Firm—Fish & Richardson P.C.

(57) ABSTRACT

Method and apparatus divide a paragraph of text into lines. The invention determines possible line breaks for multiple lines from a portion of the paragraph and selects an optimal line break that produces an ideal set of line breaks for the multiple lines from the possible line breaks.

36 Claims, 5 Drawing Sheets

In olden times when wishing still helped one, there lived a king whose daughters were all beautiful; and the youngest was so beautiful that the sun itself, which has seen so much, was astonished whenever it shone in her face. Close by the king's castle lay a great dark forest, and under an old lime-tree in the forest was a well; and when the day was very warm, the king's child went out into the forest and sat down by the side of the cool fountain; and when she was bored she took a golden ball, and threw it up on high and caught it; and this ball was her favorite plaything.

OPTIMAL LINE BREAK DETERMINATION

BACKGROUND OF THE INVENTION

This invention relates to methods and apparatus for breaking text into lines.

One operation commonly performed in preparing text materials for printing or displaying is to divide paragraphs into individual lines. When done well, readers hardly notice that the words have been arbitrarily broken into a plurality of lines. When done poorly, readers notice awkward line breaks that interrupt their train of thought, requiring more time and effort to read the text.

A conventional method for breaking a paragraph into lines determines appropriate line breaks by analyzing one line at a time. Words are added to a line until a suitable length is obtained, at which point a break is made and a new line is started. Although this method is relatively simple and fast, it fails to take into consideration that the final appearance of the paragraph as a whole and how the appearance of a given line is influenced by preceding and succeeding lines.

As discussed in Donald E. Knuth and Michael F. Plass's article entitled "Breaking Paragraph Into Lines," Software-Practice and Experience, Vol II, pp. 1119–1184 (1981), optimal line breaks may be selected by considering all feasible line breaks for one paragraph. The articles describes a method that evaluates all combinations of line breaks for a given paragraph and selects an optimal set of line breaks for the paragraph. This method was designed to operate in a batch-processing environment on a mainframe or minicomputer and not in an interactive environment of modem personal computers.

SUMMARY OF THE INVENTION

In general, in one aspect, the invention features methods and apparatus for dividing a paragraph into lines. The method includes the steps of selecting a first line break to define the end of a first line by evaluating possible line breaks for multiple possible lines in a first portion of the paragraph; and selecting a second line break to define the end of a second line following the first line by evaluating possible line breaks for multiple possible lines in a second portion of the paragraph, where the second portion overlaps the first portion but does not include words before the first line break.

Among the advantages of the invention are the following. The invention determines optimal line breaks in a paragraph by considering feasible line breaks for a portion of the paragraph covering multiple lines. The invention requires less memory space and processing time even for a long paragraph because only a portion of the paragraph at a time is analyzed to determine optimal line breaks. This is particularly important when processing a long paragraph since possible combinations of line breaks grow exponentially for a linear increase of feasible line breaks. The invention therefore is advantageous in a real-time editing environment with memory, processing resource and time constraints.

For a fuller understanding of the nature and further advantages of the invention, reference should be made to the detailed description taken in conjunction with the accompanying drawings.

DETAILED DESCRIPTION

Figure 1:
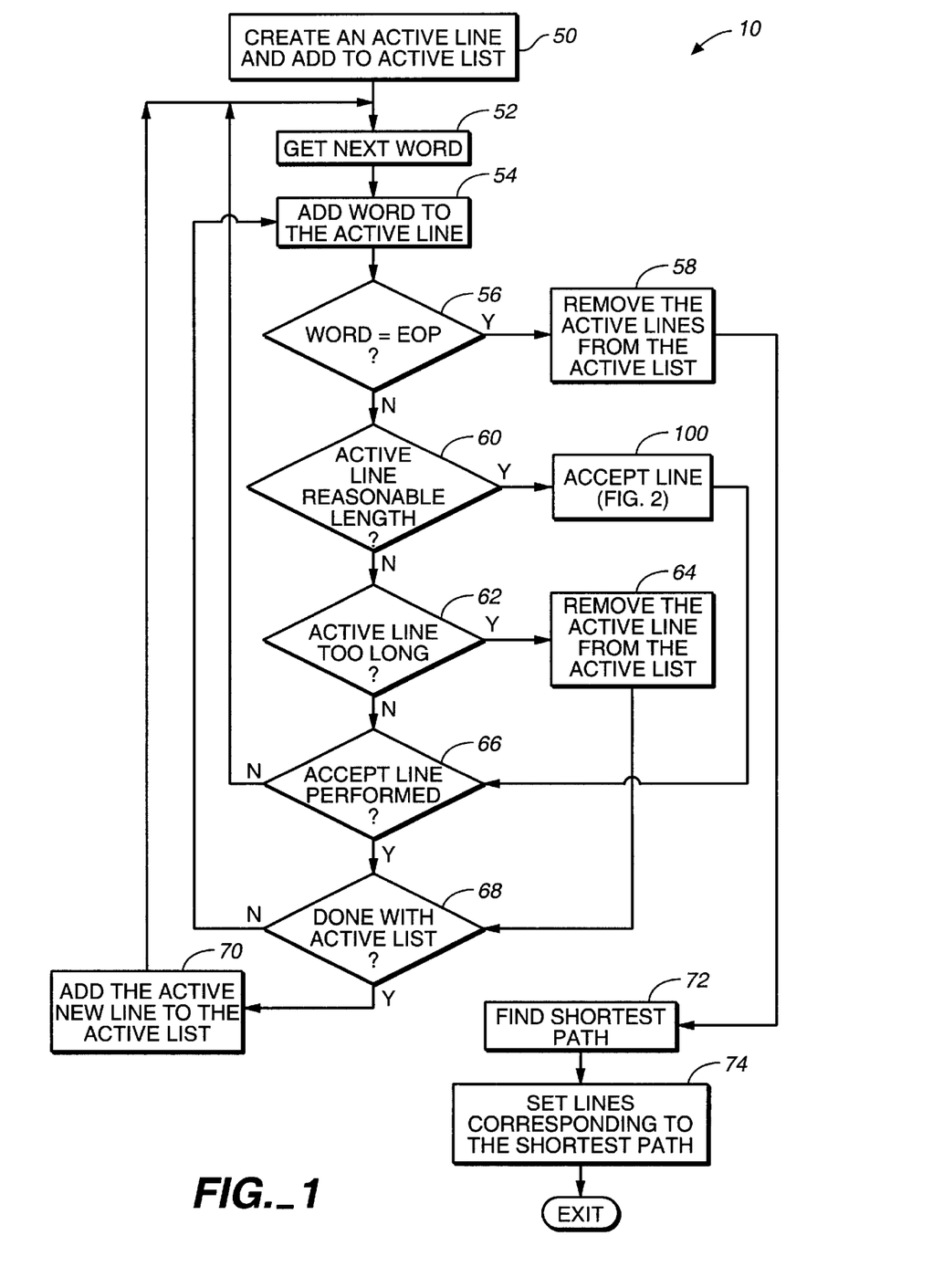
FIG. 1 shows a flow chart of a method for determining optimal line breaks for a paragraph.

FIG. 1 shows a process 10 for determining optimal line breaks for a paragraph. A first active line which is initially blank is created and added to an active list (step 50). The active line receives the words in the paragraph and is used to locate feasible line breaks in the paragraph. In this context, a "word" is an elemental unit of text and not limited to a complete word of the language. A user may set a complete word or a syllable as the elemental unit. If the user sets a complete word as the elemental unit, feasible line breaks are located at the end of the words. Alternatively, if the user sets a syllable as the elemental unit, feasible line breaks are located at the end of the syllables. The term "word" may be set to include an end-of-paragraph marker such as a carriage return and a punctuation mark trailing a word such as a comma or period.

New active lines are continuously created and existing active lines are continuously retired during the process. A retired line is an active line that has been removed from the active list for various reasons, as explained below. The retired line is discarded and is no longer considered by the process 10. The active list tracks the active lines to which a new word can be added. An active line that has not been included in the active list cannot receive a new word, as explained in more details below.

After creating the first active line, a first word in the paragraph is retrieved (step 52). The words are sequentially retrieved so the next word retrieved when step 52 is performed again would be a second word in the paragraph. The retrieved word is added to the first active line (step 54). If the word that is added to the first active line is an end-of-paragraph maker that indicates the end of the paragraph, such as a carriage return, the active line is removed from the active list and retired (step 58).

If the word is not an end-of-paragraph marker, the process 10 determines whether the first active line, including the new word, has reasonable length (step 60). An active line is deemed reasonable in length if its width can be fitted into a predetermined ideal line length and is within a predetermined tolerance of the ideal line length. The factors used to determine the width of an active line may include the pointsize, the fonts, and the kerning and side-bearing values of the characters in the line.

If the active line including the new word is reasonable in length, the line is accepted (step 100), a process discussed below in reference to FIG. 2. The acceptance of the line includes locating a feasible line break and creating another active line which is initially blank.

If the active line is not reasonable in length (step 60), the process determines whether the active line is longer than and cannot be fit into the ideal line length (step 62). If so, the active line is removed from the active list (step 64) and retired, and the process proceeds to step 68. Otherwise, the process determines whether accept line step 100 has been performed at least once (step 66). If not, the process loops back to step 52 to retrieve and add more words to the active line (step 54). Steps 52–66 are repeated until accept line step 100 has been performed.

Eventually the first active line becomes reasonable in length (step 60) and is accepted. The accepting the line includes locating a feasible line break and creating another active line (step 100). The process then determines whether additional active line exists in the active list for which the retrieved word needs to be added (step 68). If so, the process loops back to step 54 to add the retrieved word to the next active line in the active list. Otherwise, the newly created active line is added to the active list (step 70). The process then loops back to step 52 to retrieve the next word and repeat the above steps until the paragraph ends. The end of the paragraph is detected when a word added to the current active line is an end-of-paragraph marker (step 56). When this occurs, the best set of line breaks in the graph is determined using a graph metric, as will be described (step 72). The nodes in the best set of line breaks are set as the line breaks for the corresponding lines in the paragraph (step 74).

Process 10 for determining optimal line breaks for a paragraph may be more succinctly described using pseudocode, as shown in the following Table 1.

Figure 2:
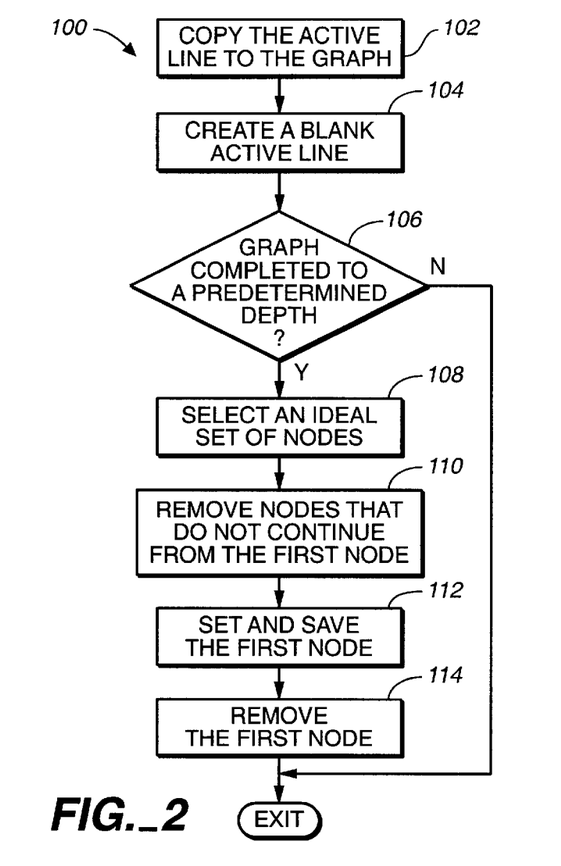
FIG. 2 shows a flow chart of a method for handling an active line of reasonable length.
Figure 5A:
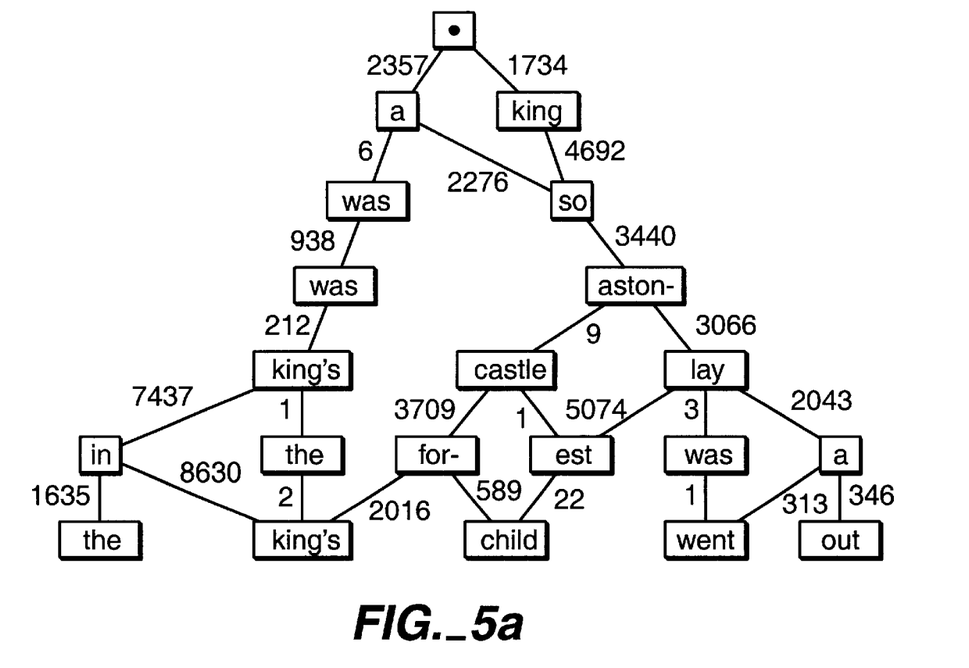
FIG. 5a shows the graph filled six levels deep.

FIG. 2 is a flow chart showing in more detail step 100 for handling an active line that is reasonable in length. The new word added to the active line is copied to a graph of feasible line breaks as a node in the graph (step 102). Thus, the end of the new word is now stored as a feasible line break. An example showing feasible line breaks in a paragraph is shown in FIG. 5a. Alternatively, the entire active line may be copied to the graph of feasible line break rather than copying only the added word to the graph.

In FIG. 5a, a graph having multiple nodes representing multiple feasible line breaks for a paragraph is illustrated. Each node is assigned a demerit number according to desirability of setting a line break at that point. The demerit number is assigned based on how much a given feasible line break causes a line to deviate from a predetermined ideal line length. The factors used in assigning the demerit number include how much the line has to be squeezed or stretched and how much the resulting line is shorter or longer than the predetermined ideal length. The demerit number is assigned to a feasible line break according to the formula $$\text{DemeritNumber} = (K \cdot R^3 + H + 1)^2 + L + LLL + LLP + CF$$

where K is a constant, R is a compress or stretch amount, H is a hyphen penalty, L is a hyphen ladder penalty, CF is a consistency factor, LLL is a last line length penalty, and LLP is a last full hyphen penalty. The hyphen penalty assigns a penalty according to the undesirability of placing a hyphen at the end of a given line. The hyphen ladder penalty assigns a penalty if the previous lines also end with a hyphen. The last line length penalizes lines that are too short or too long. The consistency factor penalizes if adjacent lines significantly differ in stretch or compress amounts. The algorithms used for determining the values of these variables are as follows.

TABLE 1

Data Structures:
    List of Active Lines
    Graph of Copied Lines
Process:
1. Create a blank first Active Line, and add it to the Active Line List.
2. Repeat steps 3–11 until the paragraph is completed:
   3. Get the next "word" from the paragraph
   4. Repeat steps 5–11 for every Active Line in the list
      5. Add the word to the Active Line
      6. If the word is an "end-of-paragraph marker" remove the Active Line from the list and continue at step 5.
      7. If the Active Line is a reasonable length, perform steps 8–10.
         8. Add a copy of the Active Line to the Graph.
         9. Create a new, blank Active Line, Add it to the Active Line List. This new line is the continuation of the line copied to the Graph.
         10. If the Graph is completed to a predetermined depth
- Find the best copied line at the specified depth.
- Trace up the Graph from this best line to the top of the Graph
- Remove everything from the Graph that is not a continuation of this top line. Also remove all Active Lines that are continuations of lines that were removed.
- Set, save, freeze the top line. Then remove it from the tree. The tree is now one level shorter.

11. If the Active Line is too long, remove the Active Line from the list.
13. The Graph of Copied Lines is complete. Find the "shortest" path through the Graph.
14. Set the lines corresponding to this shortest path.

Hyphen Penalty (H)
The hyphen penalty receives a quality rating between 0–100:
```
#define kNoHyphenPoint              0
#define kUnpreferredHyphenPoint     25
#define kRegularHyphenPoint         50
#define kPreferredHyphenPoint       75
#define kDiscretionaryHyphenPoint   80
#define kHardHyphenPoint            90
```
These amounts are scaled into hyphen penalty:
H = (100-quality rating)/scalefactor + basePenalty
Both "scalefactor" and "basePenalty" may be user defined.
Hyphen Ladder Penalty (L)
ladder = number of adjacent hyphens up to this hyphen
```
    If(ladder <= 1)
        L = 0.0;
    else if(ladder > ladderLimit)
        L = kMaxDemerit;              // never allowed
    else
        {
        L = fAdjacentHyphenFactor;    // can be user defined
        for (int l = 2; l < ladder; l++)
        L = L · fAdjacentHyphenMagnifier;  // can be user defined
        }
```
Both "fAdjacentHyphenFactor" and "fAdjacentHyphenMagnifier" may be user defined to provide the user with more control over the penalty associated with hyphen.
Last Line Length (LLL)
The last line length penalizes lines that are too short or too long. The ratio of the width of the line to the width of the frame (which is always between 0 and 1) is used to calculate the last line length penalty. The definition of too short and too long may be user defined.
```
    If (ratio < fLastLineTooShort)
        {
        LLL = (fLastLineTooShort-ratio) · 12.0 + 0.75;
        LLL = LLL · LLL · LLL · 35.0;
        }
    else if(ratio > fSettings.fLastLineTooLong)
        {
        LLL = (ratio-fSettings.fLastLineTooLong) · 15.0 + 0.75;
        LLL = LLL · LLL · LLL · 35.0;
        }
    else
        LLL = 0.0;
```
Consistency Factor (CF)
The consistency factor takes two line ratings and penalizes adjacent lines that significantly differ in stretch or compress amounts.
typedef enum {kUnknown, kTooLoose, kVeryLoose, kLoose, kNormal,
                                    kTight, kVeryTight, kTooTight}
LineTightness which are called rating1 and rating2 calculates a penalty. The factor "fConsistency" may be user defined to control the magnitude of this evaluation.
```
    // equal or unknown or irrelevant
if(rating1 == rating ||rating 1 == kUnknown || rating2 == kUnknown ||
fConsistency == 0.0)
    CF = 0.0;
else
    {
    int     diff = (number of ratings apart from each other)
    if(diff <= 1)
        CF = 0.0;                    // close enough
    else
        CF = (fConsistency · (diff-1));   // penalty
    }
```

Generally, the lower the demerit number at a point, the more desirable it is to have a line break at that point. In this example, the graph of FIG. 5a is six level deep, where each level corresponds to a line in the paragraph. The nodes in each level constitute all feasible line breaks for a line corresponding to that level. For example, the nodes labeled "a" and "king" in the first level of the graph constitute all feasible line breaks for the first line of the paragraph. Similarly the nodes labeled "was" and "so" constitute all feasible line breaks for the second line of the paragraph.

Turning back to FIG. 2, from step 102, a second active line which is initially blank is created (step 104) after the first active line has been copied to the graph. The process determines whether the graph has been completed to a predetermined depth (step 106). If not, the process of FIG. 2 terminates. If the graph has been completed to the predetermined depth, a set of the nodes from each level that produce a path with the least cumulative demerit number is selected as an ideal set of nodes (step 108). The set having the least cumulative demerit number is also referred as having the shortest path in the graph since the demerit number can be thought of as a distance measurement.

All nodes in the graph that do not continue from the first node of the shortest path, i.e., a line break in the first level, are removed from the graph (step 110). The first node is set and saved as a first line break of the paragraph (step 112). The first node is removed from the graph (step 114). The graph consequently is one level shorter and the process continues with step 66 of FIG. 1.

Figure 3:
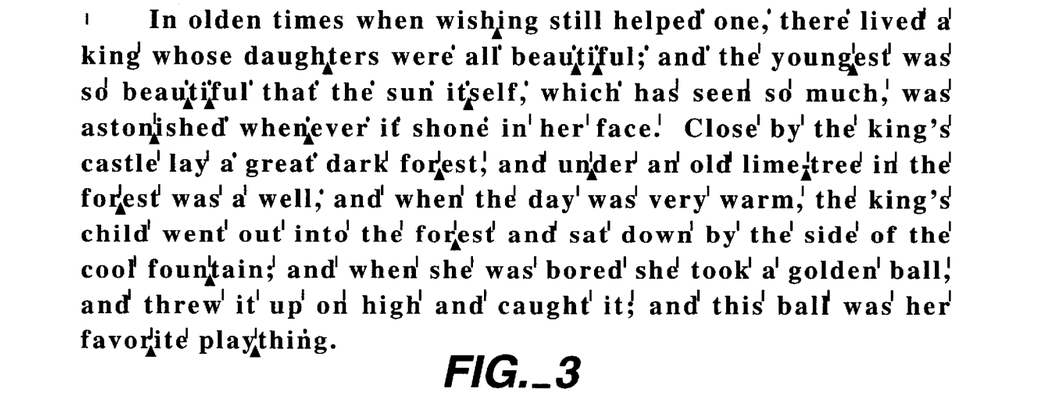
FIG. 3 shows an exemplary paragraph that is used to illustrate the operation of the present invention.

The process may be better understood by considering an example. FIG. 3 shows an exemplary paragraph that is used in the following illustrative example of the process. Little vertical marks placed in the paragraph indicate feasible break points. For purposes of this example, the graph is deemed to be completed if it is filled to six levels.

In this example, a first active line which is initially blank is created. The word "In," which is the first word of the paragraph, is retrieved and added to the first active line. Since accept line step 100 has not yet been performed, the words in the paragraph are sequentially retrieved and added to the first active line until the first active line becomes reasonable in length.

Eventually the word "a" is retrieved and added to the first active line. At this stage, the first active line is reasonable in length and is processed according to step 100.

Figure 4A:
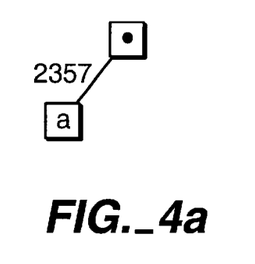
FIG. 4a shows a graph having a first node representing a first feasible line break.

In the accepting step, the end of the word "a" serves as a feasible line break because the feasible line break is located at the end of each word that makes the active line reasonable in length. The graph is provided with its first node, i.e., first feasible line break, consisting of "a" and a demerit number 3357, as shown in FIG. 4*a*. A second active line which is initially blank is created. The accepting step terminates since the graph has not been completed to the sixth level. The second active line is added to the active list.

Figure 4B:
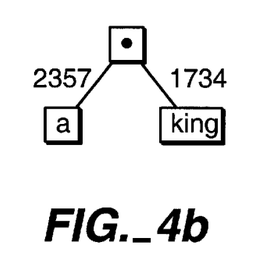
FIG. 4b shows the graph of FIG. 4a having a second node representing a second feasible line break.

The process continues by retrieving the word "king" and adding it to the first active line. The first active line is still reasonable in length so it is handled according to step 100. The graph is provided with its second node consisting of "king" and a demerit number 1734, as shown in FIG. 4*b*. A third active line which is initially blank is created. The graph still has not been completed to the sixth level so the accepting step terminates.

The active list additionally contains the second active line. The word "king" is added to the second active line. The second active line consisting of only the word "king" is neither reasonable in length nor greater than the upper character limit so the second active line is left alone. A third active line is placed in the active list and the above steps are repeated.

Eventually, the word "whose" is retrieved and added to the first active line, making the first active line unreasonable in length since the first active line now is longer than the ideal line length and cannot be fitted into the given line slot. The first active line is removed from the active list and retired.

The active list additionally contains the second and third active lines that have not yet received the word "whose." The word "whose" is added to the second active line, which now has two words "king" and "whose". It is neither reasonable in length nor longer than the ideal line length so nothing else is done to the second active line. Next the word "whose" is added to the third active line, which now has one word "whose." The third active line is neither reasonable in length nor longer than the ideal so nothing else is done to the third active line as well.

The above steps are repeated until the graph is completed to the sixth level, as shown in FIG. 5*a*. In particular, the graph is completed to the sixth level when word "out" is added to an active line and the active line is accepted. In the accepting step, the graph is provided with the node "out" and a demerit number 346. Another blank active line is created.

Figure 5B:
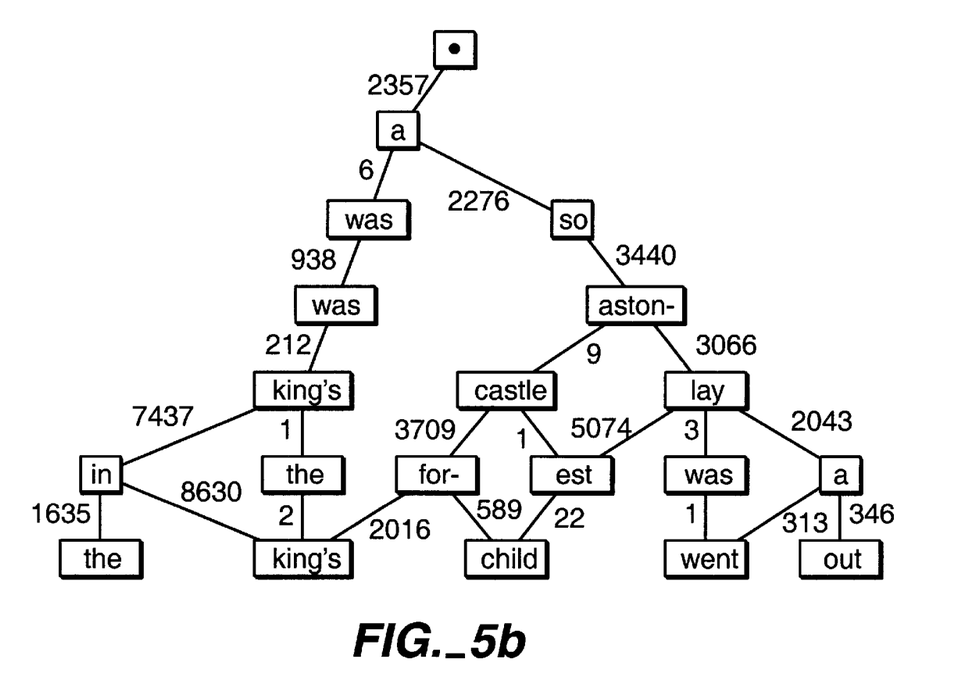
FIG. 5b shows a graph in which nodes that do not continue from a first node of a selected path have been removed.
Figure 6:
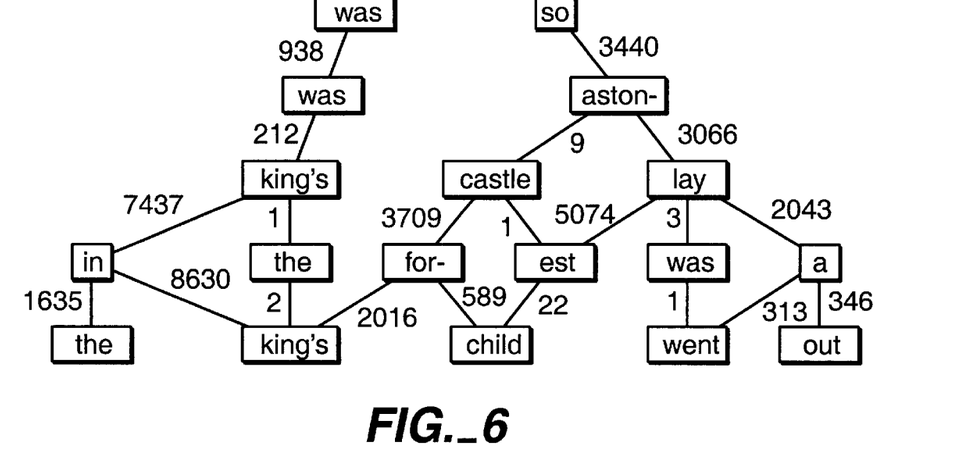
FIG. 6 shows a graph where the first node of the selected path of FIG. 5b has been removed.

Since the graph now has been completed to a desired depth, the process selects a set of nodes which defines the shortest path, i.e., has the least cumulative demerit number, from the first level to the sixth level of the graph. The path defined by the nodes "king's", "the", "king's", "was", "was", and "a" has the lowest cumulative demerit number of 3516 and is chosen as a first selected path. All nodes that do not follow from "a" in the first level of the first selected path are removed from the graph, as shown in FIG. 5*b*. The first node "a" is set and saved as the first line break for the paragraph and removed from the graph. The graph now is one level shorter, as shown in FIG. 6.

Figure 7A:
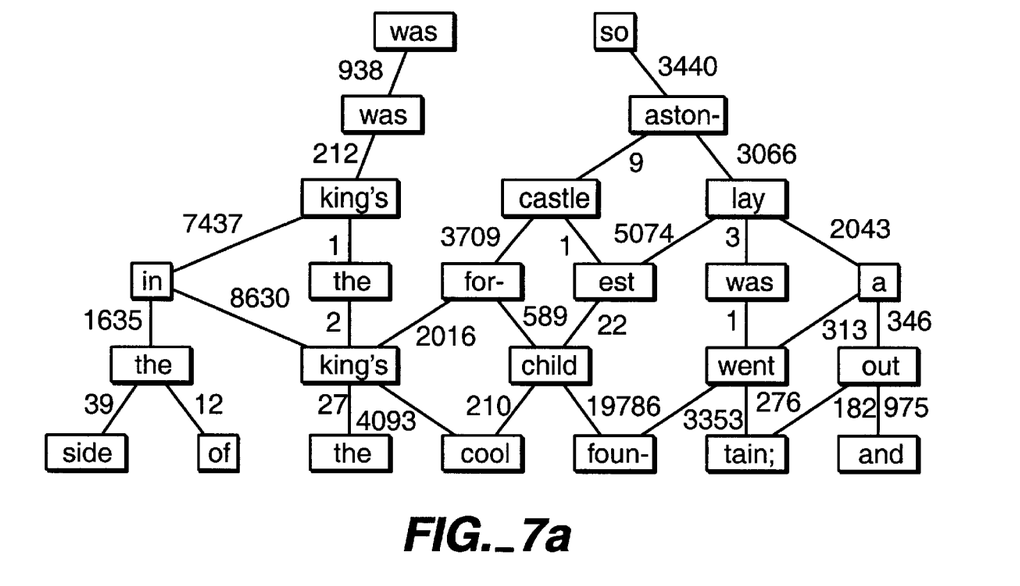
FIG. 7a shows the graph of FIG. 6 which has been completed to a sixth level.
Figure 7B:
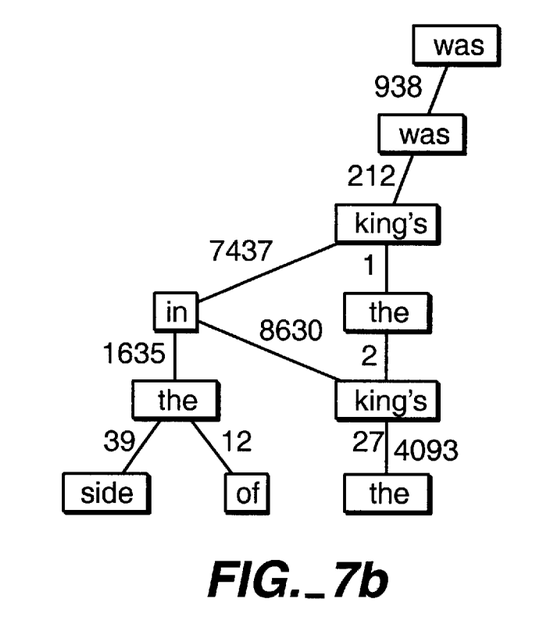
FIG. 7b shows another graph in which all nodes that do not continue from a first node of a second selected path in the graph of FIG. 7a have been removed.

The steps above are repeated and until the graph is completed to the sixth level once again. This occurs when the node "and" is added to the graph, as shown in FIG. 7*a*. The process again selects a set of nodes which defines the shortest path from the first level to the sixth level of the graph. The path defined by the nodes "the", "king's", "the", "king's", "was", and "was" has the lowest cumulative demerit number at 1156 and is chosen as a second selected path. All nodes that do not follow from the first node "was" of the second selected path are removed from the graph, as shown in FIG. 7*b*. The first node of the second selected path is set and saved as the second line break of the paragraph and then removed from the graph. The above steps are repeated until the paragraph ends.

When the paragraph ends, all active lines in the active list are removed from the active list. The shortest path through the graph is determined. The nodes in the shortest path are set as the line breaks for the corresponding lines of the paragraph. The line breaks for the entire paragraph has now been determined.

Figure 8:
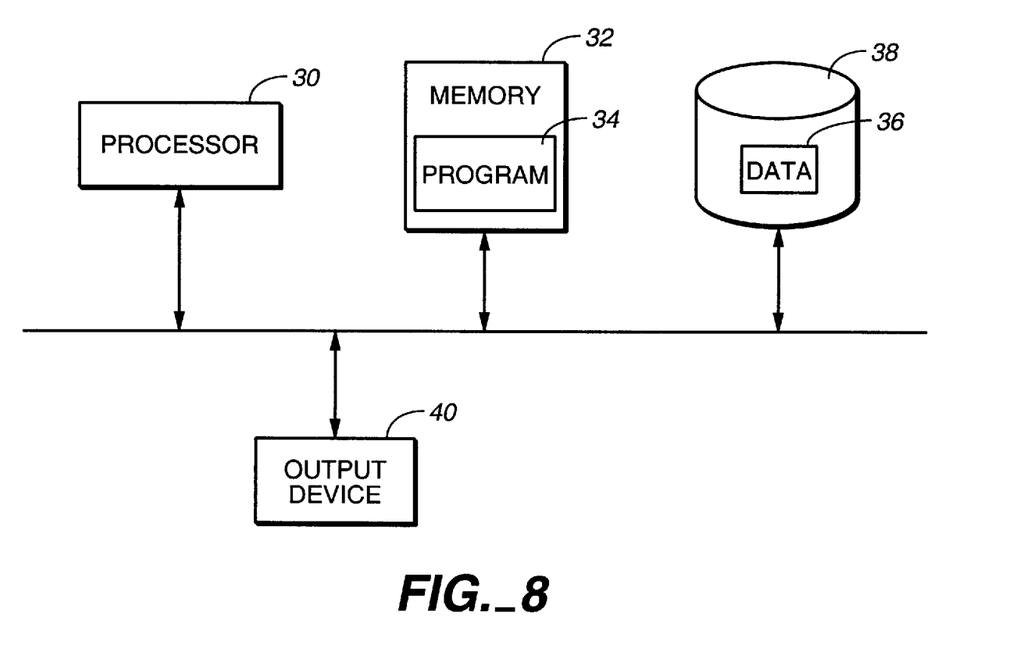
FIG. 8 is a diagram illustrating a computer suitable for determining optimal line breaks in a paragraph.

Referring to FIG. 8, an apparatus suitable for implementing a method for breaking a paragraph of text into appropriate lengths of lines include a computer processor 30, such as an integrated circuit microprocessor, and a memory 32 for storing instructions and data executed and used by the processor 30. The processor 30 running under control of a program 34 in the memory 32 has access to a paragraph 36 that is stored in a machine-readable form in the memory 32 or on a separate storage device 38. The processor 30 breaks the paragraph 36 into appropriate lines and outputs a resulting paragraph to an output device 40, such as a display screen or a printer. The processor 30 and the memory 32 may be embedded in a peripheral device such as a PostScript™ printer.

The methods described here may be readily implemented in hardware, firmware, or equivalents such as application-specific integrated circuits (ASICs), or in a computer program product tangibly embodied in a computer program storage device for execution by a computer processor. Storage devices suitable for tangible embodying computer program instructions implementing the methods described here include all forms of non-volatile memory, including semiconductor memory devices, such as EPROM, EEPROM, and flash memory devices, magnetic disks such as internal hard disks and removable disks, magneto-optical disks, and CD-ROM disks.

Although the present invention has been described in terms of a specific embodiment, the invention is not limited to this specific embodiment. For example, the reasonableness of line length may be determined by setting lower and upper character limits that may be present in the line rather than using a cumulative width calculation.

What is claimed is:

1. A method for dividing a paragraph into lines, comprising:

selecting a first line break to define the end of a first line by evaluating possible line breaks for multiple possible lines in a first portion of the paragraph, the first portion being less than the entire paragraph; and selecting a second line break to define the end of a second line immediately following the first line by evaluating possible line breaks for multiple possible lines in a second portion of the paragraph, where the second portion includes all words in the first portion after the first line break as well as additional words in the paragraph coming after the first portion and excludes all words in the first portion before the first line break.

2. The method of claim 1, wherein selecting the first line break by evaluating the possible line breaks in a first portion comprises:

calculating a figure of merit for each possible combination of possible line breaks;

comparing the calculated figures of merit to select one of the possible combinations of possible line breaks as an optimal combination; and selecting the first possible line break in the optimal combination as the selected first line break.

3. The method of claim 1, further comprising:
generating a first set of possible line breaks for the first portion of the paragraph.

4. The method of claim 1, further comprising:
generating a second set of possible line breaks for the second portion of the paragraph.

5. The method of claim 4, wherein generating the second set of possible line breaks comprises:
removing from the first set of possible line breaks the selected first line break and the possible line breaks that do not continue from the selected first line break.

6. The method of claim 1, wherein selecting the second line break by evaluating the possible line breaks in a second portion comprises:

calculating a figure of merit for each possible combination of possible line breaks;

comparing the calculated figures of merit to select one of the possible combinations of possible line breaks as an optimal combination; and selecting the second possible line break in the optimal combination as the selected second line break.

7. A method for dividing a paragraph of text into lines, comprising:

generating a first set of possible line breaks for a first portion of the paragraph to be considered;

selecting a first line break from the first set of possible line breaks;

generating a second set of possible line breaks by removing the first line break and the possible line breaks that do not continue from the first line break from the first set of possible line breaks and adding possible line breaks for text in the paragraph after the first portion; and selecting a second line break from the second set of possible line breaks.

8. The method of claim 7, wherein the first line break and the second line break are selected to divide the paragraph into lines of approximately equal length.

9. The method of claim 7, wherein each line break has a demerit rating, and wherein selecting the first line break comprises:

calculating the demerit rating of all possible ordered combinations of possible line breaks from the first set of possible line breaks;

identifying a possible ordered combination of possible line breaks with a lowest cumulative demerit number as an optimal ordered combination of possible line breaks; and selecting the first in order of the optimal ordered combination of possible line breaks as the first line break.

10. A method for dividing a paragraph of text into lines, comprising:

generating a first set of possible line breaks for a first portion of the paragraph to be considered;

selecting a first line break from the first set of possible line breaks;

generating a second set of possible line breaks by removing the first line break and the possible line breaks that do not continue from the first line break from the first set of possible line breaks and adding possible line breaks for text in the paragraph after the first portion;

selecting a second line break from the second set of possible line breaks;

wherein each line break has a demerit number;

wherein selecting the first line break comprises,
calculating the demerit number of all possible ordered combinations of possible line breaks from the first set of possible line breaks,
identifying a possible ordered combination of possible line breaks with a lowest cumulative demerit number as an optimal ordered combination of possible line breaks, and
selecting the first in order of the optimal ordered combination of possible line breaks as the first line break; and wherein the demerit number of each line break is assigned according to the formula $$\text{DemeritNumber} = (K \cdot R^3 + H + 1)^2 + L + LLL + LLP + CF$$

where K is a constant, R is a compress or stretch amount, H is a hyphen penalty, L is a hyphen ladder penalty, CF is a consistency factor, LLL is a last line length penalty, and LLP is a last full hyphen penalty.

11. A computer program on a computer-readable medium for dividing a paragraph of text into lines, the program comprising instructions to:

select a first line break to define the end of a first line by evaluating possible line breaks for multiple possible lines in a first portion of the paragraph, the first portion being less than the entire paragraph; and select a second line break to define the end of a second line immediately following the first line by evaluating possible line breaks for multiple possible lines in a second portion of the paragraph, where the second portion includes all words in the first portion after the first line break as well as additional words in the paragraph coming after the first portion and excludes all words in the first portion before the first line break.

12. The computer program of claim 11, wherein the instruction to select the first line break comprises an instruction to:

generate a set of possible line breaks for the first portion of the paragraph to be considered.

13. The computer program of claim 12, further comprising an instruction to:

remove the selected first line break and the possible line breaks that do not continue from the selected first line break from consideration.

14. The computer program of claim 11, wherein the instructions to select the first line break by evaluating the possible line breaks comprises instructions to:
  calculate a figure of merit for each possible combination of possible line breaks;
  compare the calculated figures of merit to select one of the possible combinations of possible line breaks as an optimal combination; and
  select the first possible line break in the optimal combination as the selected first line break.

15. A method for rendering a block of contiguous text so large that at least N+1 lines are required to render the block of text, where N is an integer that is at least three, comprising:
  determining possible line breaks for rendering a portion of the block of text into M+1 lines, where M is an integer that is at least two and at most N−1;
  selecting an optimal combination that results in an optimal fit for the M+1 lines by comparing combinations of the determined possible line breaks; and
  selecting a first possible line break in the optimal combination as the selected first line break.

16. The method of claim 15, wherein the selecting an optimal combination comprises:
  calculating a figure of merit for each possible combination of possible line breaks; and
  comparing the calculated figures of merit to select one of the possible combinations of possible line breaks as the optimal combination.

17. The method of claim 15, further comprising generating a hard copy of the rendered block of text.

18. The method of claim 15, further comprising generating a copy of the rendered block of text on a display device.

19. A computer-implemented method of dividing a paragraph into lines, the method comprising:
  identifying possible line breaks for a portion that is less than the entirety of the paragraph;
  selecting a predetermined maximum number;
  building a graph to the predetermined maximum number of levels using the determined possible line breaks as nodes, each level having one or more nodes which represent all possible line breaks for a line of the paragraph corresponding to the level;
  identifying a set of nodes having a least cumulative demerit number from the bottom level to the top level of the graph as an optimal set of nodes; and
  selecting the top node of the optimal set of nodes as a first line break to define the end of a first line.

20. The method of claim 19, wherein selecting the first line break comprises:
  cumulating demerit number of all possible combinations of possible line breaks;
  determining one possible combination of possible line breaks with a lowest cumulative demerit number as an optimal combination of possible line breaks; and
  selecting a parent line break of the optimal combination of possible line break as the first line break.

21. A computer-implemented method of dividing a paragraph into lines, the method comprising:
  identifying possible line breaks for a portion of the paragraph;
  building a graph to a predetermined maximum number of levels using the determined possible line break as nodes, each level having one or more nodes which represent all possible line breaks for a line of the paragraph corresponding to the level;
  identifying a set of nodes having a least cumulative demerit number from the bottom level to the top level of the graph as an optimal set of nodes; and
  selecting the top node of the optimal set of nodes as a first line break to define the end of a first line;
  wherein selecting the first line break comprises,
    cumulating demerit number of all possible combinations of possible line breaks,
    determining one possible combination of possible line breaks with a lowest cumulative demerit number as an optimal combination of possible line breaks, and
    selecting a parent line break of the optimal combination of possible line break as the first line break; and
  wherein the demerit number of each line break is assigned according to the formula $$\text{DemeritNumber} = (K \cdot R^3 + H + 1)^2 + L + LLL + LLP + CF$$

where K is a constant, R is a compress or stretch amount, H is a hyphen penalty, L is a hyphen ladder penalty, CF is a consistency factor, LLL is a last line length penalty, and LLP is a last full hyphen penalty.

22. The method of claim 21, wherein the hyphen ladder penalty assigns a penalty if the number of hyphens adjacent to a hyphen placed at the end of a given line exceeds a predetermined number.

23. The method of claim 21, wherein the last line length penalizes lines that are too short or too long.

24. A computer program on a computer-readable medium for dividing a paragraph of text into lines, the program comprising instructions to:
  generate a first set of possible line breaks for a first portion of the paragraph to be considered;
  select a first line break from the first set of possible line breaks;
  generate a second set of possible line breaks by removing the first line break and the possible line breaks that do not continue from the first line break from the first set of possible line breaks and adding possible line breaks for text in the paragraph after the first portion; and
  select a second line break from the second set of possible line breaks.

25. The computer program of claim 24, wherein the first line break and the second line break are selected to divide the paragraph into lines of approximately equal length.

26. The computer program of claim 24, wherein each line break has a demerit rating, and wherein the instruction to select the first line break comprises instructions to:
  calculate the demerit rating of all possible ordered combinations of possible line breaks from the first set of possible line breaks;
  identify a possible ordered combination of possible line breaks with a lowest cumulative demerit number as an optimal ordered combination of possible line breaks; and
  select the first in order of the optimal ordered combination of possible line breaks as the first line break.

27. A computer program on a computer-readable medium for dividing a paragraph of text into lines, the program comprising instructions to:
  generate a first set of possible line breaks for a first portion of the paragraph to be considered;
  select a first line break from the first set of possible line breaks;

generate a second set of possible line breaks by removing the first line break and the possible line breaks that do not continue from the first line break from the first set of possible line breaks and adding possible line breaks for text in the paragraph after the first portion;

select a second line break from the second set of possible line breaks;

wherein each line break has a demerit number;

wherein the instruction to select the first line break comprises instructions to, calculate the demerit number of all possible ordered combinations of possible line breaks from the first set of possible line breaks, identify a possible ordered combination of possible line breaks with a lowest cumulative demerit number as an optimal ordered combination of possible line breaks, and select the first in order of the optimal ordered combination of possible line breaks as the first line break; and wherein the demerit number of each line break is assigned according to the formula $$DemeritNumber = (K \cdot R^3 + H + 1)^2 + L + LLL + LLP + CF$$

where K is a constant, R is a compress or stretch amount, H is a hyphen penalty, L is a hyphen ladder penalty, CF is a consistency factor, LLL is a last line length penalty, and LLP is a last full hyphen penalty.

28. A computer program on a computer-readable medium for rendering a block of contiguous text so large that at least N+1 lines are required to render the block of text, where N is an integer that is at least three, the program comprising instructions to:

determine possible line breaks for rendering a portion of the block of text into M+1 lines, where M is an integer that is at least two and at most N−1;

select an optimal combination that results in an optimal fit for the M+1 lines by comparing combinations of the determined possible line breaks; and select a first possible line break in the optimal combination as the selected first line break.

29. The computer program of claim 28, wherein the instruction to select an optimal combination comprises instructions to:

calculate a figure of merit for each possible combination of possible line breaks; and compare the calculated figures of merit to select one of the possible combinations of possible line breaks as the optimal combination.

30. The computer program of claim 28, further comprising an instruction to generate a hard copy of the rendered block of text.

31. The computer program of claim 28, further comprising an instruction to generate a copy of the rendered block of text on a display device.

32. A computer program on a computer-readable medium for dividing a paragraph into lines, the program comprising instructions to:

identify possible line breaks for a portion that is less than the entirety of the paragraph;

select a predetermined maximum number;

build a graph to the predetermined maximum number of levels using the determined possible line breaks as nodes, each level having one or more nodes which represent all possible line breaks for a line of the paragraph corresponding to the level;

identify a set of nodes having a least cumulative demerit number from the bottom level to the top level of the graph as an optimal set of nodes; and select the top node of the optimal set of nodes as a first line break to define the end of a first line.

33. The computer program of claim 32, wherein the instruction to select the first line break comprises instructions to:

cumulate demerit number of all possible combinations of possible line breaks;

determine one possible combination of possible line breaks with a lowest cumulative demerit number as an optimal combination of possible line breaks; and select a parent line break of the optimal combination of possible line break as the first line break.

34. A computer program on a computer-readable medium for dividing a paragraph into lines, the program comprising instructions to:

identify possible line breaks for a portion of the paragraph;

build a graph to a predetermined maximum number of levels using the determined possible line breaks as nodes, each level having one or more nodes which represent all possible line breaks for a line of the paragraph corresponding to the level;

identify a set of nodes having a least cumulative demerit number from the bottom level to the top level of the graph as an optimal set of nodes; and select the top node of the optimal set of nodes as a first line break to define the end of a first line;

wherein the instruction to select the first line break comprises instructions to, cumulate demerit number of all possible combinations of possible line breaks, determine one possible combination of possible line breaks with a lowest cumulative demerit number as an optimal combination of possible line breaks, and select a parent line break of the optimal combination of possible line break as the first line break; and wherein the demerit number of each line break is assigned according to the formula $$DemeritNumber = (K \cdot R^3 + H + 1)^2 + L + LLL + LLP + CF$$

wherien K is constant, R is a compress or stretch amount, H is a hyphen penalty, L is a hyphen ladder penalty, CF is a consistency factor, LLL is a last line length penalty, and LLP is a last full hyphen penalty.

35. The computer program of claim 34, wherein the hyphen ladder penalty assigns a penalty if the number of hyphens adjacent to a hyphen placed at the end of a given line exceeds a predetermined number.

36. The computer program of claim 34, wherein the last line length penalizes lines that are too short or too long.

* * * * *